Patented May 20, 1947

2,420,859

UNITED STATES PATENT OFFICE 2,420,859

ALUMINUM PHOSPHATE BONDED DIAMOND ABRASIVE

Orello S. Buckner, Northboro, Mass., assignor to Bay State Abrasive Products Company, Westboro, Mass., a corporation of Massachusetts No Drawing. Application October 24, 1944, Serial No. 560,199

7 Claims. (Cl. 51—307)

The present invention relates to abrasive articles, particularly diamond abrasive articles, including wheels and hones, which are bonded with vitrified inorganic substances.

The invention has for its main object the production of an improved abrasive article, such as a grinding wheel in which diamond abrasive particles, ranging in mesh size from 16 to 600, may be used as the main abrading agent.

Grinding wheels containing diamonds are used extensively for grinding extremely hard work, such as tungsten carbide cutting tools, and the thin edges and points of such tools, when imposed with varying pressures of 15 to 300 lbs. per square inch against the cutting face of a diamond grinding wheel, produce a severe condition on the diamond grit. If not securely bonded in place by a bond of high tensile strength and high shear and compressive strength, then the diamond particles are unseated and are lost into the grinding detritus before their useful life has been fully realized. Being relatively high in price, in comparison with other types of abrading particles, such as silicon carbide and crystalline alumina, the necessity of holding each diamond particle in place in a rigid manner until it has been actually worn away at least in part by the frictional attrition of the tungsten carbide tool or other work being ground, is important economically.

Therefore, a primary requisite of the bonding material for a diamond abrasive article is that it adheres to the diamond particles, as glue adheres to metal or glass, through the ability of the bond to flow during the vitrifying process into all the surface fissures and indentations of the diamonds, and hence come intimately in contact with the diamond surfaces.

To obtain these desirable features in the characteristics of a bond for diamond abrasive articles, I employ a novel bond in the nature of a heat-hardening ceramic cement, for example, a relatively low melting salt such as anhydrous sodium phosphate ($NaH_2PO_4$) or anhydrous lithium or potassium phosphates or mixtures of two or all three, mixed with alumina ($Al_2O_3$), either amorphous or crystalline in a finely divided form.

A bond mixture of sodium phosphate and potassium phosphate in proportions of 60% of the former and 40% of the latter melts at approximately 400° F. to give a very fluid mass, much more fluid than the commonly known silica glass bonds, at this temperature. This mixture of phosphates when melted in the presence of finely divided alumina reacts therewith, if further heated, to produce a vitreous substance of extremely high tensile strength. This combination of substances constitutes a highly satisfactory bond for diamonds in that the salt first melts and wets the diamonds and later reacts with the alumina to form other compounds with extremely strong bonding qualities.

Satisfactory mixtures of sodium phosphate, potassium phosphate and alumina varying between quite wide limits are possible. However, sufficient alumina should be present to react with the alkali and phosphoric acid radicals; otherwise, the bond is soluble in water to an objectionable degree.

SATISFACTORY VARIATIONS

| 80% alkali phosphates | 60% alkali phosphates | 20% alkali phosphates |
|---|---|---|
| 20% alumina | 40% alumina | 80% alumina |

In producing diamond abrasive articles in accordance with my invention, it has been found practical to add a secondary abrasive to the diamonds in order to reduce the relative amount of diamonds required to form a skeletal frame which can be satisfactorily bonded into a hard mass. While this is not desirable from the standpoint of cutting efficiency, because the rate of cut of a diamond wheel rises as the number of diamonds in the cutting face increases, it is desirable to employ a secondary abrasive from the standpoint of cost to the user. That is, a tool made entirely of a skeletal diamond frame bonded with a vitrified substance would be beyond the pocketbook of many users. Therefore, it becomes desirable to add a secondary and cheaper abrasive to the diamond content. This abrasive should be in granular form, or in powdered form, and be stable at the temperatures required to melt the bond. It should also be more refractory than the bond and not lose its form, or melt at the temperatures used to mature the bond. Furthermore, such a secondary abrasive should be hard and strong, so that in the process of grinding it will not shatter before the bond breaks away, thus releasing the diamond grit. It may or may not be reactive with the bond.

A number of substances have been employed as secondary abrasives in combination with the bond described herein and all have worked satisfactorily. Among these are powdered crystalline alumina, or artificial corundum, emery, silicon carbide, aluminum titanate and mullite. To produce as strong a skeletal frame of diamonds and secondary abrasive as possible, it is desirable to fill the interstices between these refractory particles with as much bond as possible. When the interstices of abrasives are completely filled with a silicate glass bond, much trouble is experienced from swelling or bloating of the skeletal frame due to the expansion of trapped gases or gases evolved during the process of maturing the bond. While this same phenomenon tends to occur, but to a lesser degree, when relative large amounts of phosphate and alumina are used as a bonding agent, that is, when the amount employed is sufficient to close the interstices or pores, it has been found that the low viscosity of this particular bond permits a large part of the gases of reaction to escape. To overcome the difficulty from swelling still further, a portion of the alkali phosphate and alumina is reacted separately and introduced into the wheel in this form, after first grinding to a fine powder and incorporating with it a suitable proportion of unfused material, so that the desirable wetting property is retained. This improved procedure results in the production of a somewhat harder body than is possible when using all unfused bond, in that it permits higher bond content and substantially eliminates difficulties from swelling.

While sodium phosphate and potassium phosphate have been named as the salts to be used for reacting with alumina, in the production of my improved bond, it is apparent that other chemicals may be used as a source of these substances. Thus, sodium carbonate and phosphoric anhydride, if added in place of sodium phosphate, will react to eventually produce sodium phosphate and will also provide the desirable wetting effect on the diamonds and secondary abrasives.

Having thus described the qualities and nature of my improved bond, there is given below several examples of compositions which have been found to give a hard dense body having excellent cutting ability. The procedure is to first intimately blend these mixtures together, wet them with 2% of a solution of corn dextrine and water and then shape the mixture by molding or pressing in accordance with methods usually employed in this art. After this procedure the body is fired to red heat in a suitable oven and at a moderate rate of temperature rise.

EXAMPLE I

| | Per cent by weight |
|---|---|
| Diamond grit #100 mesh | 20 |
| Reacted sodium phosphate and potassium phosphate and alumina | 20 |
| Unreacted sodium phosphate and potassium phosphate and alumina | 10 |
| Refractory secondary abrasive (as fine alumina or corundum) | 50 |

A satisfactory composition using silicon carbide in fine powdered form as the secondary abrasive has been found to be as follows:

EXAMPLE II

| | Per cent by weight |
|---|---|
| Diamond grit #220 mesh | 20 |
| Reacted sodium phosphate and potassium phosphate and alumina | 30 |
| Unreacted sodium phosphate and potassium phosphate and alumina | 5 |
| Unreacted #600 silicon carbide | 45 |

The bond compositions here recommended are 60% alkali phosphate and 40% alumina.

These compositions are given as formulations from which satisfactory and useful diamond tools can be produced. However, these compositions may be varied between the following limits to vary the toughness or strength of the bond, the diamonds, and the secondary abrasive content, in order to obtain diamond tools suitable for the various ways in which such tools and wheels are used in industry.

| | Per cent |
|---|---|
| Diamond grit (any mesh) | 5-80 |
| Reacted sodium phosphate and potassium phosphate and alumina | 0-50 |
| Unreacted sodium phosphate and potassium phosphate and alumina | 0-30 |
| Refractory secondary abrasive as fine alumina or silicon carbide | 0-70 |

A satisfactory product has also been produced from a phosphate bond by prefusing all of it at 2000° F., grinding it to an impalpable powder and combining it with diamond dust in the following proportions:

EXAMPLE III

| | Per cent |
|---|---|
| Corn dextrine syrup | 2 |
| Prefused phosphate bond | 40 |
| 320 mesh diamond powder | 58 |
| | 100 |

EXAMPLE IV

| | Per cent |
|---|---|
| Corn dextrine syrup | 2 |
| Prefused phosphate bond | 40 |
| 320 diamond powder | 20 |
| 500 grit corundum | 28 |

These compositions when pressed into a body and fired to a temperature of 1450° F. produce a strongly bonded body. This is explained by the fact that a phosphate bond of the composition described flows with more freedom than compositions containing silica as their acid component.

When bodies such as those in Examples III and IV are fired, the prefused phosphate bond resoftens and flows together to a large degree, thus producing a strong bond, although not so strong as when a small amount of the bond is introduced in an unfused condition.

When the particles of prefused bond soften and reflow together there is a tendency to entrap small amounts between the bond particles, i. e., air that was present at the time of molding. This air interferes with the drawing together of the melting particles and is prone to remain in the structure. To eliminate this air, it has been found desirable to fire the article in an electrically heated furnace enclosed in a vacuum tank maintained at the highest vacuum possible. This vacuum procedure also prevents oxidation of the diamonds, if temperatures are carried beyond 1150° F. under these conditions.

Bonded diamond products of the compositions of Examples III and IV have been produced with a porosity of about 4%. For certain classes of grinding where the abrading force is severe, even this small degree of porosity has been found to be objectionable, since it reduces the bond strength of the diamond structure. To overcome this defect, in large part, the complete abrasive article has been dipped in a solution of heat hardenable resin, preferably under vacuum, until the pores become filled, then dried and baked at a temperature sufficient to harden the resin. A satisfactory resin has been as follows:

| | Per cent |
|---|---|
| Acetone | 10 |
| A stage phenol-formaldehyde resin | 90 |

While the compositions described so far have produced satisfactory products, it has been found desirable to further vary these compositions to obtain a modification of certain properties. Thus, replacement of part of the sodium phosphate and potassium phosphate by magnesium phosphate and calcium phosphate while increasing the fusion temperature increases bond strength. Additions of boric acid, $B_2O_3$, or other basic oxides may be employed to replace the alkaline bases, in part, to increase the tendency for this bond to flow more readily and is a desirable ingredient in small amounts. Addition of silica serves no useful purpose in that ability to flow freely is hindered by presence of silica. Additions of $P_2O_5$ and metallic oxides, or metallic phosphates as copper phosphate or iron phosphate may be made to replace part of the alkali phosphate, if a characteristic color is wanted in the bond. A composition which has given a satisfactory diamond abrasive article is as follows:

EXAMPLE V

| | Per cent |
|---|---|
| Corundum abrasive #600 grit | 40 |
| Diamond powder #150 mesh | 20 |
| Bond | 40 |

Bond composition in Example V

| | Per cent |
|---|---|
| Anhydrous sodium phosphate | 37 |
| Anhydrous potassium phosphate | 15 |
| Barium phosphate | 3 |
| Calcium phosphate | 5 |
| Boric oxide | 3 |
| Phosphorous anhydride (fused) | 2 |
| Alumina | 35 |
| Total | 100 |

If in the manufacture of a diamond tool, it becomes desirable to thicken the diamond tool in an economical manner, this may readily be done by substituting all secondary abrasive for the diamonds in Example III and integrally molding this as a separate layer to the diamond element. Furthermore, the secondary abrasive may be employed in the form of metals, such as hardened steel particles, in any of the compositions given above.

From the foregoing, it is apparent that by the present invention there is provided an improved abrasive article of the diamond abrasive type and a method of manufacturing the same. It has been found that abrasive articles made in accordance with my invention exhibit a high bond strength, to such a degree that the articles will stand up under severe conditions of use, with the diamond particles being held in place by the bond for a major portion of their useful abrading life. Therefore, tools embodying the invention can be employed commercially on an economical basis, in spite of the relatively high cost of their diamond content. Loss of diamonds, due to defective, broken or discarded tools, is reduced to a minimum in abrasive articles employing my particular composition of bond, by reason of the fact that such bonds can be broken down by sulphuric acid, so that ultimate recovery of most of the diamond grit from such tools is rendered possible.

As a result of the practice of the present invention, there is produced an improved abrasive article consisting of diamond abrasive grain held by a non-silicate bond containing, as its main ingredients, the reaction products of phosphates and alumina, which main bond ingredients control the physical characteristics of the bond to the greatest extent. In the following claims, the designation of the bond as containing substantially no silica, means a bond containing no more than a trace of silica, such as might be present due to impurities in the bond ingredients.

I claim:

1. A new article of manufacture composed essentially of diamond abrasive grain and a ceramic bond containing substantially no silica, and in which phosphates predominate to such an extent as to control the physical characteristics of the bond.

2. A new article of manufacture composed of diamond abrasive grain, a secondary abrasive, and a ceramic bond containing substantially no silica, and in which phosphates predominate to such an extent as to control the physical characteristics of the bond.

3. A new article of manufacture composed essentially of diamond abrasive grain and a bond containing substantially no silica and comprising as its main ingredients the reaction products of phosphates and alumina, which main bond ingredients control the physical characteristics of the bond of the greatest extent.

4. A new article of manufacture composed essentially of diamond abrasive grain and a bond containing substantially no silica and comprising as its main ingredients the reaction products of alkali oxides, alumina and $P_2O_5$, which main bond ingredients control the physical characteristics of the bond to the greatest extent.

5. A new article of manufacture composed essentially of diamond abrasive grain, a refractory secondary abrasive and a bond containing substantially no silica and comprising as its main ingredients the reaction products of alkali phosphates and alumina, which main bond ingredients control the physical characteristics of the bond to the greatest extent.

6. A new article of manufacture composed essentially of diamond abrasive grain, a refractory secondary abrasive, and a bond containing substantially no silica and comprising as its main ingredients the reaction products of alkali oxides, alumina and $P_2O_5$, which main bond ingredients control the physical characteristics of the bond to the greatest extent.

7. A new article of manufacture composed essentially of diamond abrasive grain bonded with a phosphated ceramic bond containing substantially no silicate and embodying a heat hardened resin in its pores or interstices.

ORELLO S. BUCKNER.

REFERENCES CITED

The following references are of record in the file of this patent:

UNITED STATES PATENTS

| Number | Name | Date |
|---|---|---|
| 1,868,931 | Vance | July 26, 1932 |
| 1,987,861 | Milligan et al. | Jan. 15, 1935 |
| 2,162,600 | Ball | June 13, 1939 |
| 1,403,416 | Katzenstein | Jan. 10, 1922 |